July 28, 1942.       U. E. BOWES       2,291,206
PRODUCTION OF METALLIC OXIDES
Filed April 29, 1938
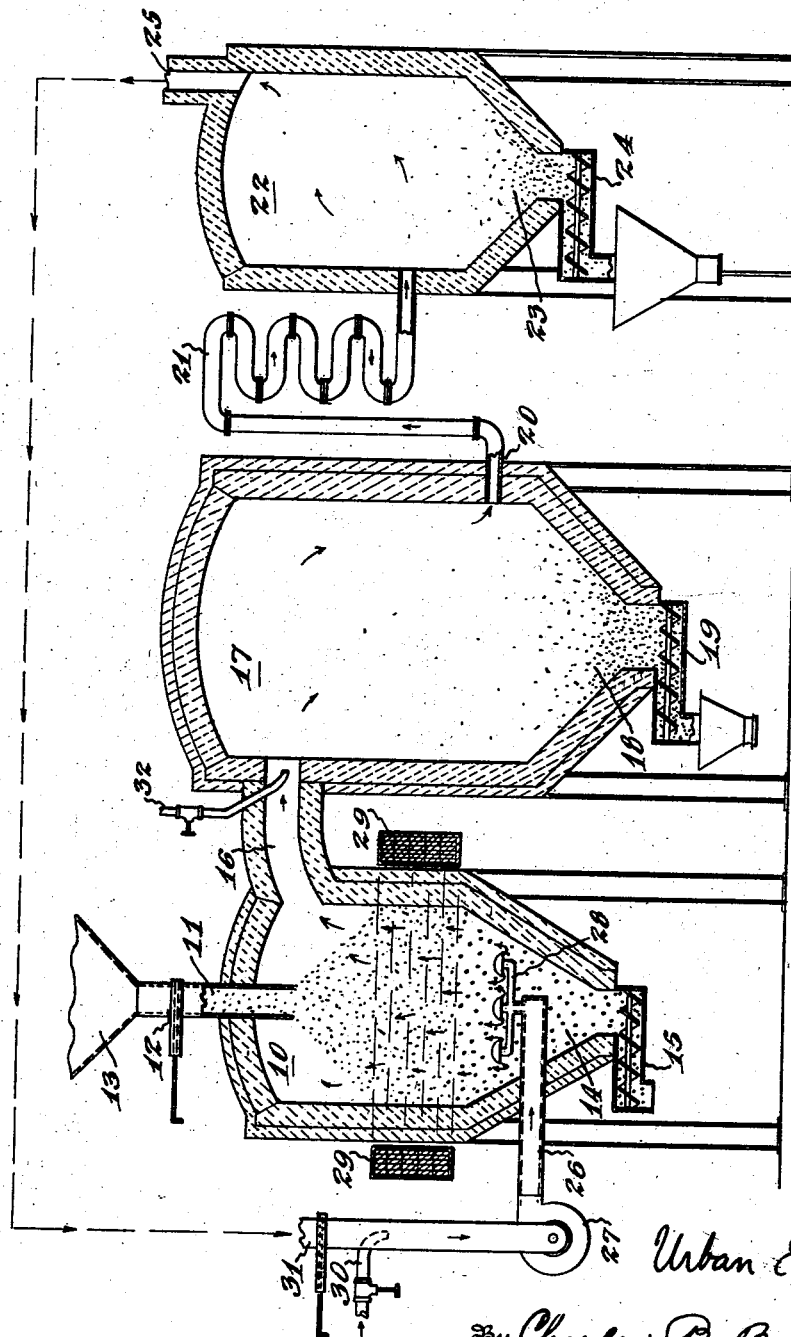
Inventor
Urban E. Bowes.
By Charles D. Belknap
Attorney Patented July 28, 1942

2,291,206

UNITED STATES PATENT OFFICE 2,291,206

PRODUCTION OF METALLIC OXIDES

Urban E. Bowes, Perrysburg, Ohio

Application April 29, 1938, Serial No. 205,015

19 Claims. (Cl. 23—200)

This invention relates to the treatment of ores or mixtures which contain iron in the form of ferric oxide and possibly also in the form of ferrous oxide, together with other constituents which it is desired to recover in pure form free from iron or iron compounds.

A good example of an ore amenable to treatment by the process of this invention is ilmenite ore, which commonly occurs as a mixture of pure ilmenite, $FeO \cdot TiO_2$, and ferric oxide, $Fe_2O_3$. This invention will be described with reference to such ore as a specific example, although the applicability of the process to other ores containing ferric oxide and generally also ferrous oxide will be readily apparent, and is included herein.

One object of this invention is to provide a process whereby the iron constituents may be recovered as ferric oxide, and the other constituents—titanium dioxide in the case of ilmenite ores—are obtained in substantially pure form free from iron or its compounds.

Another object is to accomplish this purpose by a cyclical procedure, wherein, by virtue of a reversible reaction, certain of the reactants are returned continuously to the process for re-use.

Still another object of this invention is to provide a method for obtaining ferric oxide in substantially pure form, free from other original constituents such as titanium dioxide, and also from appreciable contamination by any of the reactants added during the process.

This invention further provides a method whereby the loss and consequent expense resulting from conversion and/or discarding of reactants during the reaction may be avoided.

Other objects of this invention will appear from the following desccription.

Hydrogen chloride gas reacts on ilmenite ores in accordance with the following equations:

(1)   
$FeO \cdot TiO_2 + 2HCl = FeCl_2 + H_2O + TiO_2$ (2)   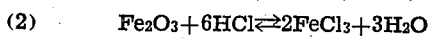
$Fe_2O_3 + 6HCl \rightleftharpoons 2FeCl_3 + 3H_2O$ Equation 1 represents the decomposition of the ilmenite proper into ferrous chloride and steam, whereas Equation 2 represents the decomposition of the ferric oxide which commonly accompanies the ilmenite to a greater or less extent.

The titanium dioxide produced in accordance with Equation 1 is in the form of small, slender crystals of rutile, free from iron compounds. Analyses show this rutile to be over 99% $TiO_2$. In view of this change in form it is apparent that the $TiO_2$ has gone through some reaction, which can not be a mere crystallization from molten $TiO_2$ as the latter melts at a temperature (about 1640° C.) some hundreds of degrees above that at which the reaction is conveniently carried out. The reaction appears to be as follows:

(3)   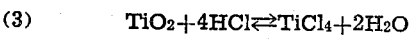
$TiO_2 + 4HCl \rightleftharpoons TiCl_4 + 2H_2O$

The titanium chloride (boiling point 136° C.) thus formed is quickly hydrolyzed back to $TiO_2$, which then appears in the form of rutile crystals. Apparently the reaction, under the conditions of the present invention, tends to go more to the left than to the right, as neither $TiO_2$ nor $TiCl_4$ appears in appreciable quantities with the iron compounds as the latter are removed. This is offered by way of explanatory theory, however, and the success of the present process does not depend upon the accuracy of this theory.

The ferrous chloride formed in the reaction has a boiling point of 1023° C. at atmospheric pressure. Unless the process is carried on at temperatures in excess of this figure, it will not sublime away from its point of formation very rapidly unless a strong stream of gaseous HCl is continuously supplied or unless the pressure is reduced. Either expedient may be employed or the temperature of the process may be raised. In any case, the ferrous chloride may be removed and condensed out as solid anhydrous $FeCl_2$ at some cooler point in the system, if desired. The steam formed simultaneously will also condense as water at a cooler part of the system.

Equation 2 represents a reaction which is reversible under proper conditions. A process for carrying on this reversible reaction is set forth in my co-pending application, Serial No. 732,488, filed June 26, 1934, which has matured into Patent No. 2,176,242 of Oct. 17, 1939, but the general principles of this reaction will be explained briefly here.

The ferric chloride and steam, produced at temperatures in excess of 1023° C. as indicated above, or at lower temperatures, as set forth hereinafter, when the production of ferrous chloride is avoided, are reduced in temperature, conveniently by passing them away from the heated reaction zone into a larger and cooler space. There they react to form crystalline ferric oxide and to release substantially all of the hydrogen chloride that was originally required to combine with the ferric oxide in the original ore. Since the boiling point of ferric chloride is 317° C. at atmospheric pressure, any temperature above that is sufficient to remove it as a gas without sublimation. The ferric oxide produced as a result of the reversible reaction may be removed from the reacting space continuously or at intervals; the hydrogen chloride gas is recycled.

The mechanism and general principles of the reversible reaction of Equation 2 will now be reviewed, as these are important in connection with the present invention. From a consideration of Equation 2, in view of the law of mass action, it is evident that the presence of an excess hydrogen chloride in the reversal part of the system represses the hydrolysis of the ferric chloride according to the 6th power of its concentration. Now, other investigators who have removed ferric oxide from ilmenite or titaniferous iron ores by means of HCl gas have done so by placing the material to be attacked in piles or heaps at the hot zone of a furnace and blown the gas over the surface of the pile. This procedure will remove the iron oxide from the titania if it is continued sufficiently long and if the pile is frequently turned over to expose fresh surface. But necessarily much more HCl goes past the pile than is necessary to react with the iron oxide.

This excess HCl, in the gas stream along with ferrous and ferric chlorides and steam, is precisely what represses the reverse action. Unless, therefore, some means is found of forcing the gas through the ore so that it will come in more intimate contact with it, the reverse reaction resulting in the formation of hematite in a cooler part of the system will scarcely be noticed. In the practical application of this method, therefore, there is provided a means of forcing the gas through the ore in such a manner that there is insufficient excess HCl in the reversal chamber to repress the reversal.

Ferric chloride and steam normally begin to react in the reverse direction to yield ferric oxide and HCl at temperatures beginning about 100° C., lower than that at which the forward reaction took place. But under certain conditions this reverse reaction may also be repressed by blowing the two vapors at too rapid a rate through the zone favorable to the growth of hematite crystals. In such a case the FeCl₃ and H₂O may condense as such or as one of their numerous hydrates, depending on temperature and other factors. To avoid this it is practical to lead the vapors of ferric chloride and steam into a chamber of larger dimensions than the hot zone in which the currents will be slower and in which there will be sufficient time for the ferric chloride and steam to react with one another.

This process as applied in the treatment of compounds such as ilmenite ore which contain both ferrous and ferric oxides preferably utilizes certain other conditions. The low volatility of ferrous chloride makes its removal from the ilmenite slow and difficult, unless the temperature is raised or the HCl current increased or the pressure of the system is lowered. Raising the temperature of the system above 1023° C. is not convenient commercially, nor can the pressure of the system be maintained at anything different from atmospheric for such active gases. And as shown in the preceding paragraphs, maintaining too rapid a flow of HCl gas has a bad effect on the reverse part of the process. Furthermore, the reaction between ferrous oxide and HCl is not reversible and the chlorine combined as ferrous chloride is not readily recoverable as HCl to be used over and over again.

The preferable process as finally worked out in connection with the use of ores containing a mixture of ferrous and ferric oxides and titania, and to which this phase of the invention is directed, involves the treatment of such ilmenite ores and the like, containing ferric oxide and also generally ferrous oxide, with hydrogen chloride gas together with an additional amount of chlorine, whereby both oxides of iron are converted into ferric chloride. The added chlorine serves to convert the ferrous chloride into ferric chloride. Then, to the gaseous mixture of ferric chloride and steam, an additional amount of steam may be added and the ferric chloride-steam mixture is allowed to react in a cooler zone to regenerate ferric oxide and hydrogen chloride.

If preferred, that portion of the ferric chloride resulting from converting the ferrous chloride to ferric chloride, may be allowed to condense as solid ferric chloride at a portion of the system maintained at a suitable temperature. That portion of the ferric chloride which was formed by reaction of ferric oxide and hydrogen chloride will have reversed to ferric oxide as described in reaction 2.

The principles of the entire reaction will be evident from the following equations, some of which have been given hereinbefore but will be repeated for clarity:

(1) $FeO \cdot TiO_2 + 2HCl = FeCl_2 + H_2O + TiO_2$ (4) $FeCl_2 + \frac{1}{2}Cl_2 = FeCl_3$ Summarizing these two equations gives:

(5) $FeO \cdot TiO_2 + 2HCl + \frac{1}{2}Cl_2 = FeCl_3 + H_2O + TiO_2$

To react the ferric chloride with steam and secure complete conversion to ferric oxide requires the addition of 3/2 mol of steam, per mol of ferric chloride, viz.:

(6) $FeCl_3 + \frac{3}{2}H_2O = \frac{1}{2}Fe_2O_3 + 3HCl$

The ferric oxide reacts as already described in some detail, and illustrated in Equation 2, which is repeated:

(2) $Fe_2O_3 + 6HCl \rightleftharpoons 2FeCl_3 + 3H_2O$

In carrying out the improved process, with reference to the treatment of ilmenite ores, the amount of chlorine to be added will be in the ratio of ½ mol thereof to two mols of hydrogen chloride, if the ore is pure ilmenite, while proportionally less chlorine (or more hydrogen chloride) is used when there are increasing amounts of ferric oxide in the ore. Thus, with equal parts of ferric oxide and pure ilmenite, the ratio should be about ½ mol of chlorine to 8 mols of hydrogen chloride. The amount of steam added is mol for mol with respect to the chlorine added, for theoretically fulfilling the requirements of the equations. Conditions which may require, or result from, modifications of these proportions will be discussed later.

To illustrate a specific example of the present improved process, reference should be had to the accompanying drawing, and to the following description.

In the drawing, 10 indicates a chamber adapted to receive the ore to be treated, which ore is fed in from the top through passage 11 which is equipped with a slide gate 12. Passage 11 connects above with the closed hopper 13 replenished in any convenient manner. Chamber 10 terminates at the bottom in a hopper 14 which communicates at its lower end with a screw conveyor 15. Chamber 10 connects through a flue 16 to chamber 17 which is substantially larger than chamber 10. The walls of chamber 17 terminate at the bottom in a hopper 18 which is provided with a screw conveyor 19 as indicated. Chamber 17 is connected through a vent 20 to a cooler 21 which terminates in chamber 22. The walls of chamber 22 terminate at the bottom in a hopper 23 provided with a screw conveyor 24. Chamber 22 is provided with an exit 25.

The walls of chambers 10, 17 and 22, also the cooler 21 should be made of a refractory or other material resistant to the gases which will circulate through the chambers and the temperatures which will prevail in them. Certain portions of the walls should be suitably insulated on their exterior surfaces and provided on the outside with a jacket of acid resistant metal to make the walls of the chambers impervious to gases.

A conduit or plurality of conduits 26 terminating in the lower portion of chamber 10 connect to a blower 27 which serves to force gas through the conduit 26 and nozzles 28 into the lower end of chamber 10. The nozzles 28 are suitably provided with openings and are so shaped that the gases leaving them will be well distributed into the descending mass of ore, while the ore will not be prevented by said nozzles from continuing its downward movement into hopper 12. Chamber 10 is equipped with an induction or other type of heating apparatus 29.

All the parts shown are so arranged and fitted together that the entire system is as completely gas- and air-tight as possible. Since the process of this invention involves a carefully controlled reversible reaction, it is desirable to prevent leakage from the apparatus as well as contamination by outside air or other gases.

In initiating the process, when the apparatus is empty except for air, the first step is to remove the air by introducing hydrogen chloride gas through conduit 26, the hydrogen chloride gas flushing the air from chambers 10, 17 and 22. The three chambers are thus filled with hydrogen chloride gas at atmospheric pressure. Ilmenite ore is introduced from hopper 13 through passage 11, filling chamber 10 to a point controlled by the elevation of the bottom of conduit 11. The ore in the upper portion of chamber 10 should then be heated to a temperature of 900° C., more or less, and a constant flow of gases from the blower maintained at a suitable rate.

Higher temperatures involve greater heat losses, and lower temperatures decrease the effectiveness of the reversing reaction, although such higher or lower temperatures may be used if desired.

When starting the operation, that portion of the ore which is in the lower portion of chamber 10, and therefore below the heated zone, will not be properly treated and should be withdrawn and returned to hopper 13 as fast as the lower portion of chamber 10 accumulates rutile formed in situ from reaction 1.

Chlorine gas from conduit 30 may be mixed with the hydrogen chloride gas in conduit 31 before reaching the blower 27. This is in accordance with reaction 4. Steam may be added in accordance with reaction 6 through nozzle 32.

As the hydrogen chloride-chlorine mixture is blown upward through chamber 10 countercurrently with the ore, reactions described herein and exemplified by Equation 5 and the left-to-right aspect of Equation 2 occur. Gaseous ferric chloride and steam produced by these reactions pass out from the top of chamber 10 through flue 16 into chamber 17. As the heated ilmenite in the upper portion of chamber 10 is disintegrated by reactions 2 and 5, the titanium tetrachloride formed in reaction 1 is reconverted to titanium dioxide in the form of rutile crystals in accordance with the right-to-left phase of reaction 3. This formation of rutile crystals occurs in situ apparently with only sufficient transport of the titanium in the form of its tetrachloride to permit re-arrangement to the rutile crystal form instead of the crystal structure which the titanium dioxide previously had as a component of ilmenite. The ferrous chloride formed simultaneously in accordance with reaction 1 may, if desired, be converted to ferric chloride by the addition of chlorine in accordance with reaction 4.

As the ferric chloride and steam pass through flue 16 and chamber 17, the mixture of gases cools slightly and the reversal indicated as the right-to-left phase of reaction 2 occurs, depositing crystalline ferric oxide which will collect in the hopper 18 at the bottom of chamber 17. This reversal begins at a temperature approximately 100° C. below that prevailing in the region where reaction 1 occurred.

The hydrogen chloride arising from the reversible reaction in chamber 17, together with any ferric chloride gas not converted to ferric oxide due to insufficient steam, either intentional or otherwise, passes through the vent 20 into the gas cooler 21 in which the temperature of the gases is lowered to approximately 400° C., which is slightly above the temperature at which the ferric chloride will condense when it reaches and is further cooled in chamber 22, where it will collect in hopper 23. The hydrogen chloride resulting from the reversal of reactions 2 and 3, together with any excess hydrogen chloride which passed through the ore bed in chamber 1 without reaction, will pass out of chamber 22 through the exit 25 to a drier, if necessary, then be recycled by passing into the system again through the conduit 31 or may be held in an intermediate storage, if preferred, available for re-use later.

The rutile collecting in hopper 14, the crystalline ferric oxide collecting in hopper 18, and the ferric chloride collecting in hopper 23 may be removed continuously or at intervals as desired through screw conveyors 15, 19 and 24 respectively.

If it is preferred to increase the proportion recovered as crystalline ferric oxide in chamber 17 as compared with the ferric chloride recovered in chamber 22, additional dry steam may be added in flue 16 through nozzle 32, thereby causing additional ferric chloride to be converted to crystalline ferric oxide in chamber 17. If it is preferred to recover a greater proportion as ferric chloride in chamber 22, the addition of steam from nozzle 32 may be lessened in amount or entirely omitted. If sufficient steam is added, it is evident from Equations 5 and 6 that for every mol of pure ilmenite treated, there are produced three mols of hydrogen chloride as against two mols of hydrogen chloride originally introduced. In practice, however, ilmenite ore contains a considerable amount of ferric oxide in addition to the pure ilmenite.

Assuming equimolar amounts of pure ilmenite and ferric oxide in the ore, there would be produced approximately nine mols of hydrogen chloride as against eight mols at the start. One way of conveniently disposing of the excess hydrogen chloride is to pass off a suitable amount intermediate between vent 21 and conduit 31 to a suitable condensing apparatus, not shown, wherein the excess hydrogen chloride is condensed with an adequate amount of steam to form aqueous hydrochloric acid.

Ilmenite ores are commonly susceptible of magnetic separation from most of their impurities, leaving substantially only $Fe_2O_3$ and $FeO \cdot TiO_2$. The ilmenite ores referred to herein are those obtained as a result of such separation. The magnetic properties of these ores indicate the presence of magnetite, $Fe_3O_4$. Magnetite is considered to be a compound of equal parts of ferrous and ferric oxides. Regardless of the association whereby magnetite is present in ilmenite or other ores, such magnetite, with or without association with other oxides of iron, is strictly amenable to treatment in accordance with this invention, and for this treatment is considered as being composed of equal parts of ferrous oxide and ferric oxide.

It is evident from the foregoing description that this invention provides a convenient method for treating ores such as ilmenite which contain ferric oxide and also generally ferrous oxide, whereby to separate these iron oxides from the other values in the ores and reconvert them, by reversible reaction, into pure ferric oxide. This process can be carried on at considerably lower temperatures than those customarily used in metallurgical processes where iron is treated, and without the use of coke or limestone or other ingredients, which, because they are decomposed or thrown away, result in considerably increased costs of operation. In the present process, the added reactants pass through a cyclical process; by means of a reversible reaction they are in large measure recovered in a relatively simple and inexpensive manner for re-use.

I claim:

1. Method of obtaining ferric oxide from a composition which contains both ferrous and ferric oxides, comprising as steps heating the composition at a temperature below 1000° C. and above the volatilization point of ferric chloride with a mixture of hydrogen chloride gas and chlorine gas whereby to effect conversion of all the oxides of iron to gaseous ferric chloride and simultaneously to produce steam, causing a substantial drop in temperature of said ferric chloride and steam to a point which is still in excess of the subliming point of the ferric chloride, and adding an additional amount of steam at least about equal to 1½ mol of steam per mol of ferrous oxide originally present, maintaining the mixture of steam and ferric chloride at about said lowered temperature until a substantial proportion thereof has been reconverted to ferric oxide and hydrogen chloride by a reversal of the original reaction.

2. Method of treating ilmenite ores to recover separately rutile and ferric oxide therefrom, which comprises heating the ilmenite at a temperature below 1000° C. and above the volatilization point of ferric chloride with a gaseous mixture of chlorine and hydrogen chloride to yield gaseous ferric chloride, steam and rutile, removing the resulting gaseous ferric chloride and steam from the crystals of rutile produced, causing a substantial drop in temperature of said ferric chloride and steam to a point which is still in excess of the subliming point of the ferric chloride, adding a small additional amount of steam, maintaining the mixture of steam and ferric chloride at said lowered temperature until a substantial proportion thereof has been converted to ferric oxide and hydrogen chloride by a reversal of the original reaction, and recirculating the hydrogen chloride for the treatment of further amounts of ilmenite.

3. Method of treating ilmenite ores to recover separately rutile and ferric oxide therefrom, which comprises heating the ilmenite at a temperature below 1000° C. and above the volatilization point of ferric chloride with a gaseous mixture of chlorine and hydrogen chloride to yield gaseous ferric chloride, steam and rutile, the molal ratio of hydrogen chloride to chlorine being at least 4 to 1, removing the resulting gaseous ferric chloride and steam from the crystals of rutile produced, causing a substantial drop in temperature of said ferric chloride and steam to a point which is still in excess of the subliming point of the ferric chloride, and adding a small additional amount of steam, the molal ratio of said added steam to the chlorine being at least about 1 to 1, maintaining the mixture of steam and ferric chloride at said lowered temperature until a substantial proportion thereof has been converted to ferric oxide and hydrogen chloride by a reversal of the original reaction, and recirculating the hydrogen chloride for the treatment of further amounts of ilmenite.

4. Method of treating ilmenite ores to recover separately rutile and ferric oxide therefrom, which comprises heating the ilmenite at a temperature below 1000° C. and above the volatilization point of ferric chloride with a gaseous mixture of chlorine and hydrogen chloride to yield gaseous ferric chloride, steam and rutile, so limiting the amount of chlorine used that substantially no free oxygen is produced by the reaction, removing the resulting gaseous ferric chloride and steam from the crystals of rutile produced, causing a substantial drop in temperature of said ferric chloride and steam to a point which is still in excess of the subliming point of the ferric chloride, and adding a small additional amount of steam, whereby the total steam present is sufficient in amount to permit the conversion to ferric oxide of all the ferric chloride produced from ferrous oxide, maintaining the mixture of steam and ferric chloride at said lowered temperature until a substantial proportion thereof has been converted to ferric oxide and hydrogen chloride by a reversal of the original reaction, and recirculating the hydrogen chloride for the treatment of further amounts of ilmenite.

5. Method of treating ilmenite ores to recover separately rutile and ferric oxide therefrom, which comprises heating the ilmenite at a temperature below 1000° C., and above the volatilization point of ferric chloride with a gaseous mixture of chlorine and hydrogen chloride to yield gaseous ferric chloride, steam and rutile, removing the resulting gaseous ferric chloride and steam from the crystals of rutile produced, causing a substantial drop in temperature of said ferric chloride and steam to a point which is still in excess of the subliming point of the ferric chloride, and adding a small additional amount of steam, maintaining the mixture of steam and ferric chloride at said lowered temperature until a substantial proportion thereof has been converted to ferric oxide and hydrogen chloride by a reversal of the original reaction, withdrawing the hydrogen chloride together with any unconverted ferric chloride and steam, subjecting this mixture to further treatment to recover ferric oxide, drying the hydrogen chloride gas, and returning said gas to the apparatus for recirculation and re-use.

6. Method of treating ilmenite ores to recover separately rutile and ferric oxide therefrom, which comprises heating the ilmenite at a temperature below 1000° C. and above the volatilization point of ferric chloride with a gaseous mixture of chlorine and hydrogen chloride to yield gaseous ferric chloride, steam and rutile, removing the resulting gaseous ferric chloride and steam from the crystals of rutile produced, causing a substantial drop in temperature of said ferric chloride and steam to a point which is still in excess of the subliming point of the ferric chloride, and adding a small additional amount of steam, maintaining the mixture of steam and ferric chloride at said lowered temperature until a substantial proportion thereof has been converted to ferric oxide and hydrogen chloride by a reversal of the original reaction, withdrawing the residual ferric chloride and hydrogen chloride, condensing to solids said ferric chloride in this mixture, and removing the same therefrom and returning the balance of the hydrogen chloride to the apparatus for recirculation and re-use.

7. Method of obtaining ferric oxide from a composition which contains both ferrous and ferric oxides, comprising as steps heating the composition at a temperature below 1000° C. and above the volatilization point of ferric chloride with a mixture of hydrogen chloride gas and chlorine gas whereby to effect conversion of all the oxides of iron to gaseous ferric chloride and simultaneously to produce steam, removing the resulting gaseous products from said composition, causing a substantial drop in temperature of said ferric chloride and steam to a point which is still in excess of the subliming point of the ferric chloride, so limiting the amount of hydrogen chloride in proportion to the gaseous ferric chloride formed that after separating the gaseous ferric chloride and steam from the mass a substantial degree of reversal of the original reaction is effected on the lowering of the temperature of the mixture of ferric chloride and steam, and adding an additional amount of steam at least about equal to 1½ mols of steam per mol of ferrous oxide originally present, maintaining the mixture of steam and ferric chloride at about said lowered temperature until a substantial proportion of said ferric chloride has been reconverted to ferric oxide and hydrogen chloride by a reversal of the original reaction.

8. The continuous method of treating ore containing ferric oxide and titanium oxide, to recover separately rutile and ferric oxide therefrom, which comprises establishing a bed of said ore in subdivided state, continually feeding additional said ore in subdivided state into said bed, forcing slowly through said bed in close contact with the particles thereof throughout the bed hydrogen chloride gas in limited amount at a temperature below the melting point of the ore and above the volatilization point of titanium tetrachloride, producing gaseous titanium chloride and causing a reversal in situ of said reaction to produce titanium dioxide in the form of rutile crystals, removing said crystals from said bed, producing in said bed a mixture of gaseous ferric chloride and steam, separating said mixture from said bed, lowering the temperature of said mixture to a point not lower than the subliming point of ferric chloride and causing a reversal of the original reaction to reproduce ferric oxide and hydrogen chloride, and recirculating the said reproduced hydrogen chloride gas into said bed for reacting further amounts of said ore.

9. The continuous method of treating ore containing ferric oxide and titanium oxide, to recover separately rutile and ferric oxide therefrom, which comprises establishing a bed of said ore in subdivided state, continually feeding additional said ore in subdivided state into said bed, passing through said bed in close contact with the particles thereof hydrogen chloride gas at a temperature below the melting point of the said ore and above the volatilization point of titanium tetrachloride, producing gaseous titanium chloride and causing a reversal in situ of said reaction to produce titanium dioxide in the form of rutile crystals, removing said crystals from said bed, so limiting the amount of hydrogen chloride in proportion to the gaseous ferric chloride formed that after separating the gaseous ferric chloride and steam from the bed a substantial degree of reversal of the original reaction is effected on the lowering of the temperature of the mixture of ferric chloride and steam, producing in said bed a mixture of gaseous ferric chloride and steam, separating said mixture from said bed, lowering the temperature of said mixture to a point not lower than the subliming point of ferric chloride and causing a reversal of the original reaction to reproduce ferric oxide and hydrogen chloride, and recirculating the said reproduced hydrogen chloride gas into said bed for reacting further amounts of said ore.

10. Method of obtaining ferric oxide from a composition which contains both ferrous and ferric oxides, comprising as steps heating the composition at a temperature below the melting point of the composition and above the volatilization point of ferric chloride with a mixture of hydrogen chloride gas and chlorine gas whereby to effect conversion of all the oxides of iron to gaseous ferric chloride and simultaneously to produce steam, causing a substantial drop in temperature of said ferric chloride and steam to a point which is still in excess of the subliming point of the ferric chloride, and adding an additional amount of steam at least about equal to 1½ mol of steam per mol of ferrous oxide originally present, maintaining the mixture of steam and ferric chloride at about said lowered temperature until a substantial proportion thereof has been reconverted to ferric oxide and hydrogen chloride by a reversal of the original reaction.

11. Method of treating ilmenite ores to recover separately rutile and ferric oxide therefrom, which comprises heating the ilmenite at a temperature below the melting point of the ilmenite and above the volatilization point of ferric chloride with a gaseous mixture of chlorine and hydrogen chloride to yield gaseous ferric chloride, steam and rutile, removing the resulting gaseous ferric chloride and steam from the crystals of rutile produced, causing a substantial drop in temperature of said ferric chloride and steam to a point which is still in excess of the subliming point of the ferric chloride, adding a small additional amount of steam, maintaining the mixture of steam and ferric chloride at said lowered temperature until a substantial proportion thereof has been converted to ferric oxide and hydrogen chloride by a reversal of the original reaction, and recirculating the hydrogen chloride for the treatment of further amounts of ilmenite.

12. The method of treating titaniferous ores to recover separately titanium dioxide and ferric oxide therefrom, which comprises establishing a bed of titaniferous ore in subdivided state, continually feeding additional titaniferous ore in subdivided state into said bed, forcing through said bed in close contact with the particles thereof within said bed, a gaseous mixture composed of hydrogen chloride and chlorine at a temperature below the melting point of the ore and above the volatilization point of ferric chloride to yield gaseous ferric chloride, steam and titanium dioxide, so limiting the amount of hydrogen chloride in proportion to the gaseous ferric chloride formed that after separating the gaseous ferric chloride and steam from the mass a substantial degree of reversal of the original reaction is effected on the lowering of the temperature of the mixture of ferric chloride and steam, removing the resulting gaseous ferric chloride and steam from the titanium dioxide produced, causing a substantial drop in temperature of said ferric chloride and steam to a point which is still in excess of the subliming point of the ferric chloride, maintaining the mixture of steam and ferric chloride at said lowered temperature until a substantial proportion has been reconverted to ferric oxide and hydrogen chloride by a reversal of the original reaction, recirculating the hydrogen chloride for the treatment of further amounts of titaniferous ore, and recovering the remaining ferric chloride by condensation.

13. The method of treating titaniferous ores containing titanium dioxide and ferric oxide to recover by means of a continuous cyclic process separately titanium dioxide and ferric oxide therefrom, which comprises establishing a bed of said titaniferous ore in subdivided state, continually feeding additional said titaniferous ore in subdivided state into said bed, forcing through said bed in close contact with the particles thereof within said bed, hydrogen chloride gas at a temperature below the melting point of the ore and above the volatilization point of ferric chloride to yield gaseous ferric chloride, steam and titanium dioxide, so limiting the amount of hydrogen chloride in proportion to the gaseous ferric chloride formed that after separating the gaseous ferric chloride and steam from the mass a substantial degree of reversal of the original reaction is effected on the lowering of the temperature of the mixture of ferric chloride and steam, removing the resulting gaseous ferric chloride and steam from the titanium dioxide produced, causing a substantial drop in temperature of said ferric chloride and steam to a point which is still in excess of the subliming point of the ferric chloride, maintaining the mixture of steam and ferric chloride at said lowered temperature until a substantial proportion has been reconverted to ferric oxide and hydrogen chloride by a reversal of the original reaction, recirculating the hydrogen chloride for the treatment of further amounts of said titaniferous ore, separating the remaining gaseous ferric chloride, and recovering the same by condensation.

14. The method of treating titaniferous ores containing titanium dioxide and ferric oxide, to recover separately titanium dioxide and ferric oxide therefrom, which comprises establishing a bed of said titaniferous ore in subdivided state, continually feeding additional said titaniferous ore in subdivided state into said bed, forcing through said bed in close contact with the particles thereof within said bed, hydrogen chloride gas at a temperature below the melting point of the ore and above the volatilization point of ferric chloride to yield gaseous ferric chloride, steam and titanium dioxide, so limiting the amount of hydrogen chloride in proportion to the gaseous ferric chloride formed that after separating the gaseous ferric chloride and steam from the mass a substantial degree of reversal of the original reaction is effected on the lowering of the temperature of the mixture of ferric chloride and steam, removing the resulting gaseous ferric chloride and steam from the titanium dioxide produced, causing a substantial drop in temperature of said ferric chloride and steam to a point which is still in excess of the subliming point of the ferric chloride, maintaining the mixture of steam and ferric chloride at said lowered temperature until a substantial proportion has been reconverted to ferric oxide and hydrogen chloride by a reversal of the original reaction, and recirculating the hydrogen chloride for the treatment of said further amounts of titaniferous ore.

15. The method of treating ilmenite ore containing both ferrous and ferric oxides to recover separately titanium dioxide, ferrous chloride and ferric oxide therefrom, which comprises establishing a bed of ilmenite ore in subdivided state, continually feeding additional ilmenite ore in subdivided state into said bed, forcing through said bed in close contact with the particles thereof within said bed, hydrogen chloride gas at a temperature below the melting point of the ore and above the volatilization point of ferric chloride to yield gaseous ferrous chloride, gaseous ferric chloride, steam and titanium dioxide, so limiting the amount of hydrogen chloride in proportion to the gaseous ferric chloride formed that after separating the gaseous ferric chloride and steam from the mass a substantial degree of reversal of the original reaction is effected on the lowering of the temperature of the mixture of ferric chloride and steam, removing the resulting gaseous products from the titanium dioxide produced, causing a substantial drop in temperature of said ferric chloride and steam to a point which is still in excess of the subliming point of the ferric chloride, maintaining the mixture of steam and ferric chloride at said lowered temperature until a substantial proportion has been reconverted to ferric oxide and hydrogen chloride by a reversal of the original reaction, and recirculating the hydrogen chloride for the treatment of further amounts of titaniferous ore.

16. The method of treating titaniferous ores to recover separately titanium dioxide in the form of rutile crystals and iron content therefrom, which comprises establishing a bed of titaniferous ores in subdivided state, continually feeding additional titaniferous ore in subdivided state into said bed, forcing through said bed in close contact with the particles thereof within said bed, hydrogen chloride gas at a temperature below the melting point of the titaniferous ore and above the volatilization point of titanium tetrachloride to yield gaseous ferric chloride, steam and rutile, so limiting the amount of hydrogen chloride in proportion to the gaseous ferric chloride formed that after separating the gaseous ferric chloride and steam from the mass a substantial degree of reversal of the original reaction may be effected on the lowering of the temperature of the mixture of ferric chloride and steam and the titanium dioxide content of the ore is reacted with hydrogen chloride to rearrange its structure in situ to the form of rutile crystals, causing titanium dioxide in said bed to form rutile crystals in situ, removing the said rutile crystals from said bed, and separating the gaseous products of the reaction from said bed.

17. The method of treating titaniferous ores containing ferric oxide and titanium oxide, to recover separately titanium dioxide in the form of rutile crystals and the ferric iron content, therefrom, which comprises establishing a bed of said titaniferous ores in subdivided state, continually feeding additional said titaniferous ore in subdivided state into said bed, forcing through said bed in close contact with the particles thereof within said bed, a mixture of hydrogen chloride gas and chlorine gas at a temperature below the melting point of the titaniferous ore and above the volatilization point of titanium tetrachloride to yield gaseous ferric chloride, steam and rutile, so limiting the amount of hydrogen chloride in proportion to the gaseous ferric chloride formed that after separating the gaseous ferric chloride and steam from the mass a substantial degree of reversal of the original reaction may be effected on the lowering of the temperature of the mixture of ferric chloride and steam and the titanium dioxide content of the ore is reacted with hydrogen chloride to rearrange its structure in situ to the form of rutile crystals, causing titanium dioxide in said bed to form rutile crystals in situ, removing the said rutile crystals from said bed, separating the gaseous products of the reaction from said bed, causing a substantial drop in temperature of said ferric chloride and steam to a point which is still in excess of the subliming point of the ferric chloride, and adding an additional amount of steam at least about equal to 1½ mol of steam per mol of ferrous oxide originally present, and maintaining the mixture of steam and ferric chloride at about said lowered temperature until a substantial proportion thereof has been reconverted to ferric oxide and hydrogen chloride by a reversal of the original reaction.

18. The method of treating titaniferous ores to recover separately titanium dioxide in the form of rutile crystals and iron content therefrom, which comprises establishing a bed of titaniferous ores in subdivided state, continually feeding additional titaniferous ore in subdivided state into said bed, forcing through said bed in close contact with the particles thereof within said bed, a mixture of hyrogen chloride gas and chlorine gas at a temperature below the melting point of the titaniferous ore and above the volatilization point of titanium tetrachloride to yield gaseous ferric chloride, steam and rutile, so limiting the amount of hydrogen chloride in proportion to the gaseous ferric chloride formed that after separating the gaseous ferric chloride and steam from the mass a substantial degree of reversal of the original reaction may be effected on the lowering of the temperature of the mixture of ferric chloride and steam and the titanium dioxide content of the ore is reacted with hydrogen chloride to rearrange its structure in situ to the form of rutile crystals, causing titanium dioxide in said bed to form rutile crystals in situ, removing the said rutile crystals from said bed, separating the gaseous products of the reaction from said bed, causing a substantial drop in temperature of said ferric chloride and steam to a point which is still in excess of the subliming point of the ferric chloride, maintaining the mixture of steam and ferric chloride at said lowered temperature until a substantial proportion has been reconverted to ferric oxide and hydrogen chloride by a reversal of the original reaction, and recirculating the hydrogen chloride for the treatment of further amounts of titaniferous ore.

19. The method of treating titaniferous ores containing ferric oxide and titanium oxide, to recover separately titanium dioxide in the form of rutile crystals and iron content therefrom, which comprises establishing a bed of titaniferous ores in subdivided state, continually feeding additional titaniferous ore in subdivided state into said bed, forcing through said bed in close contact with the particles thereof within said bed, hydrogen chloride gas at a temperature below the melting point of the titaniferous ore and above the volatilization point of titanium tetrachloride to yield gaseous ferric chloride, steam and rutile, so limiting the amount of hydrogen chloride in proportion to the gaseous ferric chloride formed that after separating the gaseous ferric chloride and steam from the mass a substantial degree of reversal of the original reaction may be effected on the lowering of the temperature of the mixture of ferric chloride and steam and the titanium dioxide content of the ore is reacted with hydrogen chloride to rearrange its structure in situ to the form of rutile crystals, causing titanium dioxide in said bed to form rutile crystals in situ, removing the said rutile crystals from said bed, separating the gaseous products of the reaction from said bed, causing a substantial drop in temperature of said ferric chloride and steam to a point which is still in excess of the subliming point of the ferric chloride, maintaining the mixture of steam and ferric chloride at said lowered temperature until a substantial proportion has been reconverted to ferric oxide and hydrogen chloride by a reversal of the original reaction, recirculating the hydrogen chloride for the treatment of further amounts of titaniferous ore, and recovering the remaining ferric chloride by condensation.

URBAN E. BOWES.